Nov. 23, 1971     L. L. HILL, JR     3,621,811
INDICATING CONDITION CONTROLLER

Filed Feb. 16, 1970     3 Sheets-Sheet 1

INVENTOR
LYMAN L. HILL, JR.

BY Omund R. Dahle
ATTORNEY.

Nov. 23, 1971  L. L. HILL, JR  3,621,811

INDICATING CONDITION CONTROLLER

Filed Feb. 16, 1970

INVENTOR.
LYMAN L. HILL, JR.

BY Osmund R. Dahle

ATTORNEY.

Nov. 23, 1971　　　L. L. HILL, JR　　　3,621,811
INDICATING CONDITION CONTROLLER
Filed Feb. 16, 1970　　　　　　　　　　　3 Sheets-Sheet 3

INVENTOR
LYMAN L. HILL, JR.
BY
Omund R. Dahl
ATTORNEY.

United States Patent Office 3,621,811
Patented Nov. 23, 1971

3,621,811
INDICATING CONDITION CONTROLLER
Lyman L. Hill, Jr., St. Paul, Minn., assignor to
Honeywell Inc., Minneapolis, Minn.
Filed Feb. 16, 1970, Ser. No. 11,389
Int. Cl. G09f 9/00
U.S. Cl. 116—129                5 Claims

ABSTRACT OF THE DISCLOSURE

An improved visual presentation for an indicating temperature controller for use in controlling the temperature of an area and indicating the temperature of the area. A scale plate carries a circular temperature scale. Manual rotation of the scale plate rotates the temperature scale about an axis. A meter whose pointer is at a rest position between extremities of movement is energized by the error voltage and has a pointer which rotates about the axis and is capable of swinging through a 250° arc substantially equal to the arc length of the temperature scale. The scale plate is coupled to rotate as the potentiometer wiper moves so that the set point indicator indicates the set point temperature and the pointer position indicates the thermocouple temperature. The rotatable scale face is a disc made of a transparent material having white scale division lines painted onto the scale face and also having a white circular border or band painted around the periphery of the scale face. Within this opaque band the set point indicia numerals are formed by leaving the numerals transparent. The stationary meter face, which is of the same color as the painted band and the scale division lines, has superimposed thereon a 250° dark arcuate mask which contrasts with the white division lines carried by the movable scale face, this arc equaling the movement of the indicating meter, so that as the scale face is adjusted throughout its range, the division lines and numerals which are in the range of the meter pointer movement stand out sharply and those which are out of the range of possible movement of the pointer tend to disappear. The operator's attention is thus constantly directed to the operative portion of the meter face.

BACKGROUND AND SUMMARY OF THE INVENTION

This application is an improvement in the visual presentation of data to a user in the indicating condition controller disclosed in the co-pending application Ser. No. 795,386, filed Dec. 23, 1968, an entitled "Indicating Condition Controller." The improvement is in the set point and meter assembly of an indicating condition controller which has a meter whose pointer has a rest position, the deviation meter being energizable to cause the pointer to move over a given distance in either direction from the rest position, and which further has a movable set point scale having an arcuate scale length which is approximately the same as the length of possible movement of the meter pointer. The entire rotatable scale plate is visible, however, and it is desired to emphasize or enhance the scale markings in the upper portion thereof only. The stationary face plate of the meter cooperates with the see-through movable scale which is positioned in front thereof, the face plate having a color characteristic which contrasts with the movable scale over a distance which is coincident with the distance of possible movement of the meter pointer and in which the remainder of the stationary face plate has a similar color characteristic to the movable scale markings so that in a constant sector of the meter face plate the scale face is emphasized and the scale markings stand out sharply, while fading out or being visibly obscure in the remainder of the face plate.

DESCRIPTION OF THE PREFERRED EMBODIMENT

Figure 1:
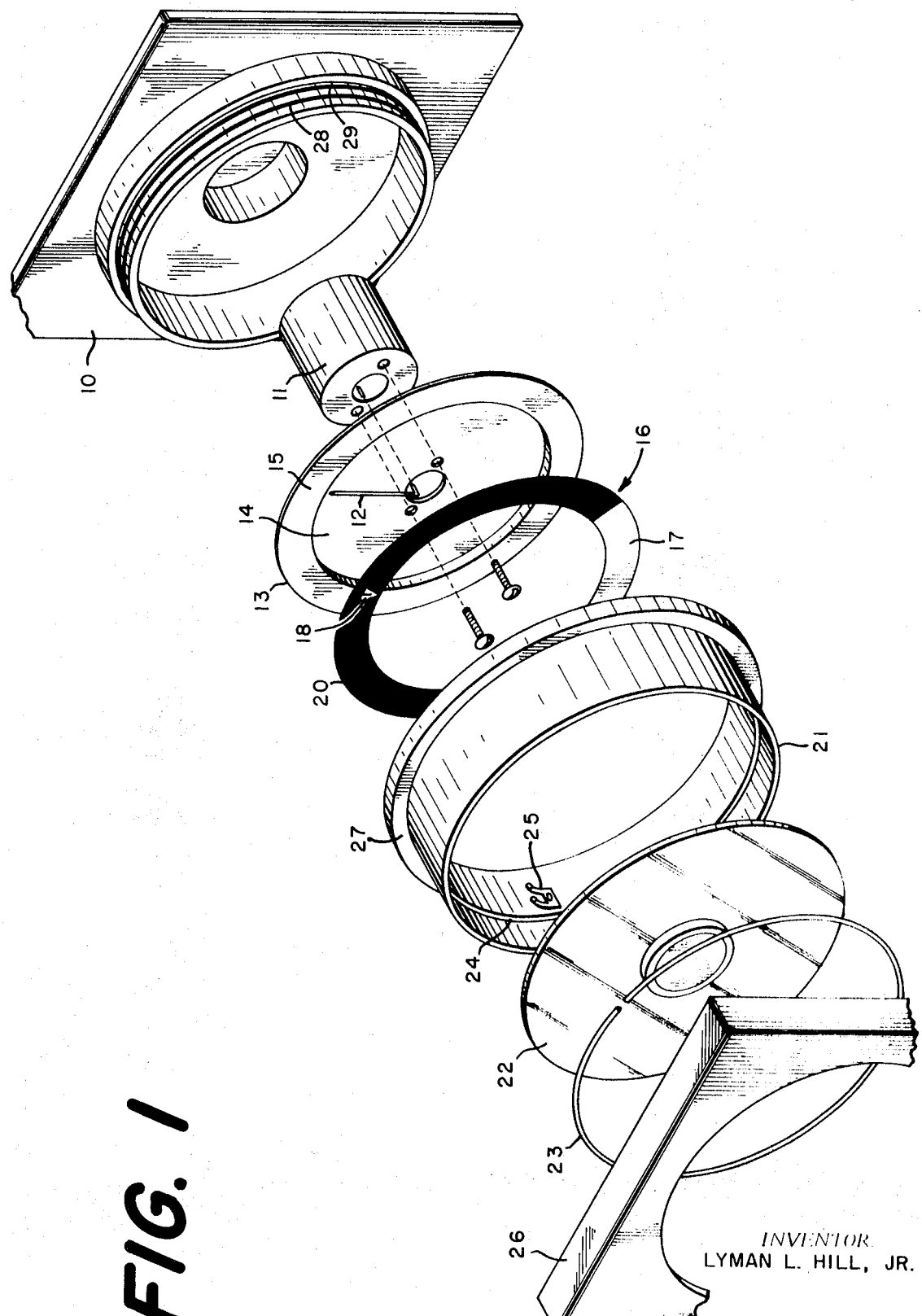
FIG. 1 is an exploded view of the set point and meter assembly of the indicating condition controller,
FIG. 2 discloses the movable scale face.

Referring now to FIG. 1 in which the meter and set point potentiometer assembly is shown in exploded view, there is disclosed a base member 10 into which is mounted a meter 11. The meter is of a deviation type whose pointer is at rest at a position between extremities of movement of the pointer. Specifically the meter of FIG. 1 is a zero center meter having a vertical rest or zero-center position. The pointer 12 is capable of moving equal distances either direction from this position and the extent of movement of the pointer is approximately 125° either side of the zero-center position, or a total arc length of movement of 250°. Affixed to the front of the meter movement is a meter face 13, which has a central depressed area 14 surrounded by an elevated area 15 and which is of a first color, for example, white. The meter pointer 12 operates within the depressed area. A meter ring 16 which is fastened to the meter face plate area 15 has an arcuate portion 17 which is of the same color as the meter face plate, that is, white, and a 250° arcuate portion 20 is of a contrasting color and may be, for example, black. The 250° arc of the contrasting color is coextensive with the 250° arc of movement of the meter pointer 12. There is a triangular set point index mark 18 of another color, such as red, at the center or midposition of the 250° arc length. The meter ring 16 and the meter face plate 13 are stationary with respect to the base element 10. If desired, the ring 16 may be replaced by painting arcuate portion 20 directly onto area 15.

The assembly of FIG. 1 further includes three parts which move or rotate as a unit, these being a potentiometer ring 21, scale face 22 and a scale face retainer spring 23. The scale face 22 is mounted within the potentiometer ring 21 against the flange 24 of the potentiometer ring and is secured therein by the retainer spring 23. The potentiometer ring 21 also includes with an arcuate wiper assembly 25 which cooperates with an arcuate resistive element 28 and pickup element 29 of base member 10. The cover 26, which is fastened to base member 10, is spring loaded against shoulder section 27 of the potentiometer ring and retains it within the assembly.

Figure 2:
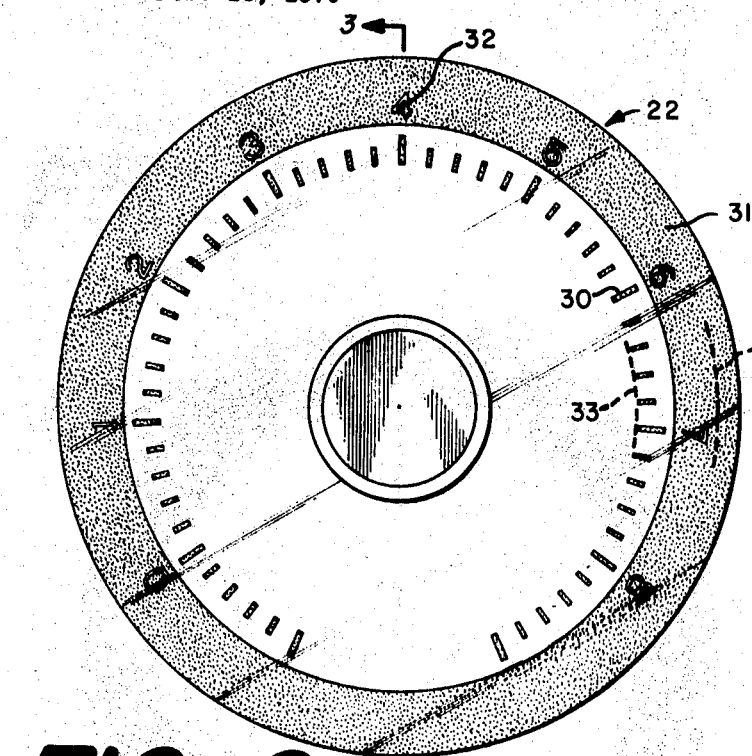

The constructural details of the scale face 22 are shown in FIG. 2. The scale face 22 is a transparent disc having laid on one surface thereof a circular temperature scale including the opaque indicia markings or scale division lines 30 and an outer opaque ring 31 both being of a paint or similar material which is of the same color as the main portion of the face plate, that is, white. The numerals are formed in the opaque white ring 31 by the absence of the opaque coating, the numerals thus being transparent numerals on an opaque field. The dotted lines 33 and 34, not a part of the scale face, indicate the inner and outer radius of the black contrasting ring 20, when the scale face is in position in front of the meter face plate. Rotation of the potentiometer ring rotates the circular scale about an axis. The set point is established by rotating the potentiometer ring assembly 21, which includes the scale face 22, so that the desired scale division line coincides with the triangular set point index mark 18.

Figure 3:
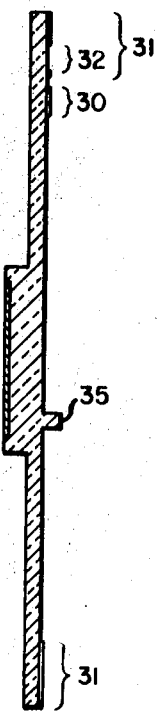
FIG. 3 is a cross-section view of FIG. 2 along lines 3—3.

FIG. 3 is a cross section of the transparent scale face of FIG. 2 and shows clearly the opaque coating ring 31 and indicia 30 on the rear surface of the disc, this coating having been exaggerated in thickness for illustrative purposes. It will be noted that the cross section cuts through the numeral 4, which has been identified as 32, and that this numeral has been formed by leaving off the opaque coating. A stop 35 projects from beneath the scale face disc and provides a limit for the meter pointer movement so that no ambiguity as to indicated temperature can occur when a high or low set point is selected by the user.

Figure 6:
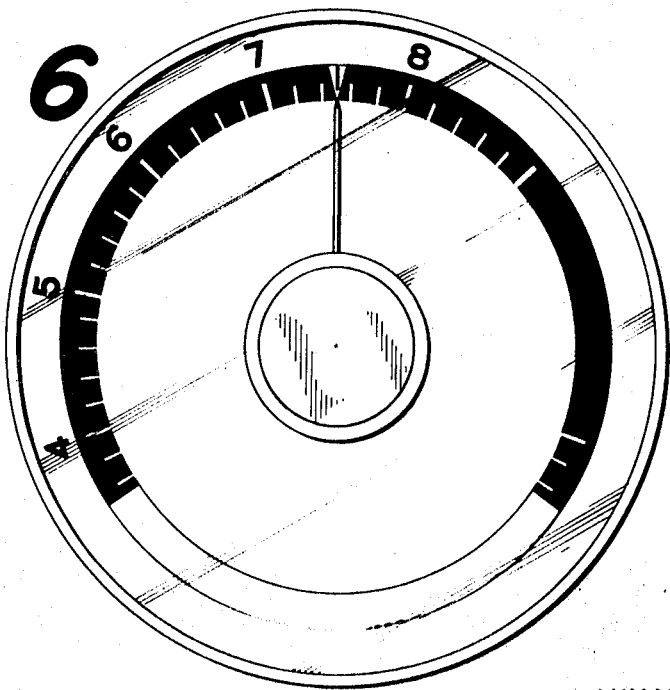
FIG. 6 is a representation of the controller set at a high setting.

FIG. 6 discloses a set point of 750°, near the high end of the 0–800° F. range. Rotation of the scale has now made visible some of the scale division marks at the low end of the scale. The stop 35 prevents the meter pointer 12 from indicating falsely in the low end of the scale in the event of an actual temperature condition much higher than set point, for example, 1000° F. Large over-temperature error signals will drive the meter to the right over its full travel, bringing up the possibility of a false reading if some stop mechanism were not provided.

Figure 4:
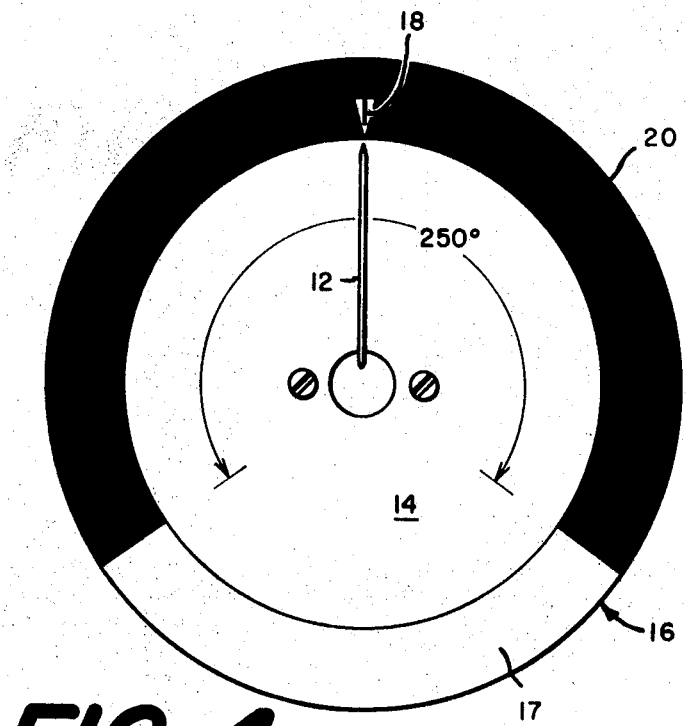
FIG. 4 is a representation of the meter face including the contrasting face plate portion to be positioned beneath the indicia of the scale face of FIG. 2.

FIG. 4 discloses a meter ring 16 and the meter face area 14 and meter pointer 12 assembly. The black portion 20 of the meter ring extends for 250° of the arc and is coextensive with the 250° meter movement. The white portion of the arc 17 is the same color as the meter face plate portion 14, the indicia markings 30 and opaque ring portion 31. On the meter ring 16, which positions behind the numerals 32 and indicia 30 of the scale face, the black arc portion 20 makes a strong color contrast behind the white indicia 30 emphasizing or enhancing them and making them stand out sharply.

The numerals 32 which are positioned over the contrasting arc 20 stand out in strong relief and appear as black numerals in a white field. The indicia on the other hand appear as white indicia in a black field. Numerals which are superimposed over the white area 17 of the meter ring fade out and are obscured to the viewer. Any indicia 30 which are over the white portion 17 of the meter ring also face out, are visibly obscure and are not seen since there is no contrast between the white indicia and white background.

Figure 5:
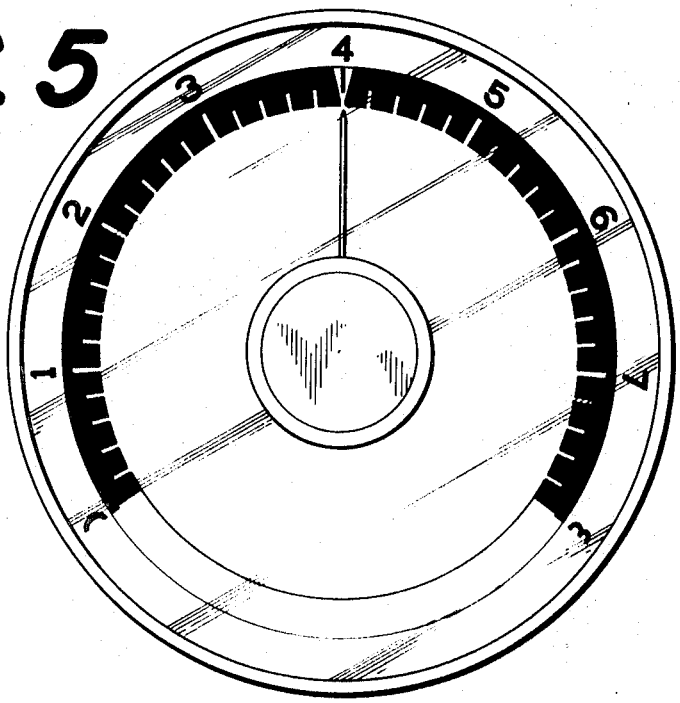
FIG. 5 is a representation of the controller set at mid scale.

FIG. 5 discloses a mid scale setting of 4, which may represent 400° in a 0 to 800° F. scale range, and it is noted that the black arc 20 draws the viewer's attention to the effective portion of the meter face while fading out everything in the lower 110° of the meter face. FIG. 6 discloses a set point of 750°, near the high end of the 0–800° F. range, and again it will be noted that the black arc 20 cooperating with the scale face draws the viewer's attention to the upper 250° of the meter face. It will be noted that the portion of the scale of 300° and below is not visible since the colors of the indicia 30, the scale face ring 31, the meter ring portion 17, and the meter face plate all blend together.

The embodiments of the invention in which an exclusive property or right is claimed are defined as follows:

1. In an indicating condition controller having a meter whose pointer has a rest position, the meter being energizable to cause said pointer to move over a given distance either direction from said rest position, and having a movable scale the scale length of which is substantially the same as the length of possible movement of said pointer, said pointer rest position corresponding to the set point condition of the controller, the improvement comprising:

a stationary face plate cooperating with said scale, said face plate having a characteristic which contrasts with said scale over a distance which is coincident with the distance of possible movement of said pointer, said face plate having a similar characteristic to said scale for the portion of said face plate which is outside of the possible movement of said pointer so that the visibly enhanced portion of the movable scale is coincident with the possible movement of said pointer and the visibly obscured portion of the movable scale is coincident with the similar characteristic portion of said stationary face plate.

2. In an indicating condition controller a combination to improve the visual presentation of data to a user, the combination comprising:

a meter whose pointer has a rest position, the meter being energizable to cause said pointer to move over a given distance either direction from said rest position, said pointer rest position corresponding to the set point condition of the controller;

a movable scale having a scale length which is substantially the same as the length of possible movement of said pointer; and a stationary meter face plate behind said movable scale cooperating with said scale, said face plate having a characteristic which contrasts with said scale over a section which is coincident with the distance of possible movement of said pointer to emphasize said scale in said contrasting section, said face plate having a similar characteristic to said scale for the portion of said face plate which is outside of the possible movement of said pointer to de-emphasize said scale in said similar portion.

3. The combination in accordance with claim 2 wherein said scale comprises a transparent rotatable scale face having thereon an arcuate scale and wherein rotation of said scale face rotates said arcuate scale about an axis.

4. The combination in accordance with claim 3 wherein said arcuate scale comprises opaque scale division lines of a light color and wherein said face plate contrasting characteristic is of a dark color.

5. The comination in accordance with claim 3 wherein said arcuate scale comprises transparent numerals on an opaque field, said opaque field being of a light color and wherein said face plate contrasting characteristic is of a dark color.

References Cited
UNITED STATES PATENTS

| | | | |
|---|---|---|---|
| 2,847,539 | 8/1958 | Pounds et al. | 337—376 X |
| 3,051,001 | 8/1962 | Laviana et al. | 337—376 X |
| 3,065,325 | 11/1962 | Schlaich | 236—1 C X |
| 3,232,401 | 2/1966 | Jones | 116—129 X |
| 3,275,235 | 9/1966 | Balch | 116—133 X |

FOREIGN PATENTS

| | | | |
|---|---|---|---|
| 812,958 | 5/1959 | Great Britain | 337—376 |
| 1,903,364 | 9/1969 | Germany | 116—129 |

LOUIS J. CAPOZI, Primary Examiner

U.S. Cl. X.R.

116—133; 219—506; 236—46; 337—376